(12) United States Patent
Xiang

(10) Patent No.: US 9,195,557 B2
(45) Date of Patent: Nov. 24, 2015

(54) FAULT TREE ANALYSIS SYSTEM, FAULT TREE ANALYSIS METHOD AND PROGRAMME

(75) Inventor: Jianwen Xiang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 198 days.

(21) Appl. No.: 14/000,733

(22) PCT Filed: Feb. 17, 2012

(86) PCT No.: PCT/JP2012/053826
§ 371 (c)(1),
(2), (4) Date: Aug. 21, 2013

(87) PCT Pub. No.: WO2012/115007
PCT Pub. Date: Aug. 30, 2012

(65) Prior Publication Data
US 2013/0332775 A1    Dec. 12, 2013

(30) Foreign Application Priority Data
Feb. 22, 2011    (JP) .................................. 2011-035872

(51) Int. Cl.
*G06F 11/00* (2006.01)
*G06F 11/26* (2006.01)
*G06F 11/07* (2006.01)
*G05B 23/02* (2006.01)
*G06F 11/22* (2006.01)

(52) U.S. Cl.
CPC ............ *G06F 11/26* (2013.01); *G05B 23/0248* (2013.01); *G06F 11/079* (2013.01); *G06F 11/2252* (2013.01)

(58) Field of Classification Search
CPC .......................... G06F 11/26; G05B 23/0248
USPC ................................. 714/4, 23, 15, 26, 36, 37
See application file for complete search history.

(56) References Cited

U.S. PATENT DOCUMENTS

2009/0113248 A1*    4/2009   Bock et al. ...................... 714/39
2011/0137703 A1*    6/2011   Dugan et al. ................. 705/7.28

FOREIGN PATENT DOCUMENTS

JP           3445517 B2       9/2003
JP           2010-181212 A    8/2010

OTHER PUBLICATIONS

D. M. Rasmuson, et al., "FATRAM—A Core Efficient Cut-Set Algorithm", IEEE Transactions on Reliability, Oct. 1978, pp. 250-253, vol. R-27, No. 4.

Antoine Rauzy, "Toward an Efficient Implementation of the MOCUS Algorithm", IEEE Trans. on Reliability, 2003, pp. 175-180, vol. 52, No. 2.

Masafumi Nakamura, "Standardization for FTA (fault tree analysis) Technique", [online], Jun. 1, 2010, The Journal of reliability Engineering Association of Japan, pp. 244-251, vol. 32, No. 4, [retrieval date May 15, 2012], Internet <http://ci.nii.ac.jp/els/110007658298.pdf?id=ART0009474449&type=pdf&lang=jp&host=cinii&_order_no=&ppv_type=0〈_sw=&no=1337073293&cp=>.

(Continued)

*Primary Examiner* — Dieu-Minh Le
(74) *Attorney, Agent, or Firm* — Sughrue Mion, PLLC

(57) ABSTRACT

The present invention is a fault tree analysis system, comprising: k/n conjunction weeding means for weeding a conjunction including disjoint basic k/n gates and/or disjoint simple k/n gates and removing the conjunction if its order is greater than a given maximal order of minimal cut sets.

12 Claims, 4 Drawing Sheets

(56) References Cited

OTHER PUBLICATIONS

Minoru Mukuda, "Study on Optimal Design for System Reliability by Multiobjective Genetic Algorithms", [online], Jun. 2005, pp. 12-19, [retrieval date May 15, 2012], Internet <http://dspace.wul.waseda.ac.jp/_dspace/bitstream/2065/5445/1/Honbun-4059.pdf>.

Kevin S. Brown, "Evaluating Fault Trees (AND & OR Gates Only) with Repeated Events", [online], Jun. 1990, IEEE Transactions on Reliability, pp. 226-235, vol. 39, No. 2, [retrieval date May 15, 2012], Internet <http:// ieeexplore.ieee.org/stamp/stamp.jsp?arnumber=00055886>.

Jong Soo Choi, et al., "Truncation Error Evaluation Method for Minimal Cut Set-Based Fault Tree Analysis", [online], Taylor & Francis, Oct. 2005, Journal of Nuclear Science and Technology, pp. 854-860, vol. 42, No. 10, [retrieval date May 15, 2012], Internet <http://www.tandfonline.com/doi/pdf/10.1080/18811248.2005.9711036>.

(English Translation) International Preliminary Report on Patent Ability, related to PCT/JP2012/053826, dated Apr. 2, 2013.

International Search Report for PCT/JP2012/053826, dated May 29, 2012.

\* cited by examiner

FIG. 5

$$\begin{cases} e \cdot {}^k\!/\!_n(e_1+e, e_2,...,e_n) = e \cdot {}^{(k-1)}\!/\!_{(n-1)}(e_2,...,e_n) & k > 1 & (5-1a) \\ e \cdot {}^k\!/\!_n(e_1+e,...,e_n) = e & k = 1 & (5-1b) \\ e \cdot {}^k\!/\!_n(e, e_2,...,e_n) = e \cdot {}^{(k-1)}\!/\!_{(n-1)}(e_2,...,e_n) & k > 1 & (5-1c) \\ e \cdot {}^k\!/\!_n(e,...,e_n) = e & k = 1 & (5-1d) \\ {}^k\!/\!_n(e_1+e,...,e_m+e, e_{m+1},...,e_n) = e + {}^k\!/\!_n(e_1,...,e_n) & m \geq k & (5-2a) \\ {}^k\!/\!_n(e_1+e,...,e_m+e, e_{m+1},...,e_n) = e \cdot {}^{(k-m)}\!/\!_{(n-m)}(e_{m+1},...,e_n) + {}^k\!/\!_n(e_1,...,e_n) & 1 < m < k & (5-2b) \\ {}^k\!/\!_{n+1}(e_1, e_1, e_2,...e_n) = e_1 \cdot {}^{(k-2)}\!/\!_{(n-1)}(e_2,...,e_n) + {}^k\!/\!_{(n-1)}(e_2,...,e_n) & & (5-3) \\ e + {}^k\!/\!_n(e_1+e, e_2,...,e_n) = e + {}^k\!/\!_n(e_1,...,e_n) & & (5-4a) \\ e + {}^k\!/\!_n(e_1 \cdot e, e_2,...,e_n) = e + {}^k\!/\!_{(n-1)}(e_2,...,e_n) & & (5-4b) \\ e + {}^k\!/\!_n(e, e_2,...,e_n) = e + {}^k\!/\!_{(n-1)}(e_2,...,e_n) & & (5-4c) \end{cases}$$

FIG. 6

$${}^9\!/\!_{12}(b_1, b_2, \cdots, b_{12})$$

FIG. 7

$$b_1 + b_2 + b_3 + b_4 + b_{56} + b_{57} + b_{74} + b_{126} + b_{127} + b_{128} + b_{179} + b_{180} +$$
$${}^2\!/\!_2(b_{58} + b_{127}, b_{59} + b_{127}) +$$
$${}^2\!/\!_2(b_{60} + b_{127}, b_{61} + b_{127}) +$$
$${}^2\!/\!_2(b_{62} + b_{127}, b_{63} + b_{127}) +$$
$${}^2\!/\!_2(b_{64} + b_{127}, b_{65} + b_{127}) +$$
$${}^2\!/\!_2(b_{66} + b_{127}, b_{67} + b_{127}) +$$
$${}^9\!/\!_{12}(b_6 + b_{56} + b_{57} + b_{74} + b_{76} + b_{127} + b_{128} + b_{129} +$$
$$\quad {}^2\!/\!_2(b_{58} + b_{127}, b_{59} + b_{127}) + {}^2\!/\!_2(b_{60} + b_{127}, b_{61} + b_{127}) + {}^2\!/\!_2(b_{62} + b_{127}, b_{63} + b_{127}) +$$
$$\quad {}^2\!/\!_2(b_{64} + b_{127}, b_{65} + b_{127}) + {}^2\!/\!_2(b_{66} + b_{127}, b_{67} + b_{127}),$$
$$\quad b_7 + b_{56} + b_{57} + b_{74} + b_{77} + b_{127} + b_{128} + b_{130} +$$
$$\quad {}^2\!/\!_2(b_{58} + b_{127}, b_{59} + b_{127}) + {}^2\!/\!_2(b_{60} + b_{127}, b_{61} + b_{127}) + {}^2\!/\!_2(b_{62} + b_{127}, b_{63} + b_{127}) +$$
$$\quad {}^2\!/\!_2(b_{64} + b_{127}, b_{65} + b_{127}) + {}^2\!/\!_2(b_{66} + b_{127}, b_{67} + b_{127}),$$
$$\ldots)$$

FAULT TREE ANALYSIS SYSTEM, FAULT TREE ANALYSIS METHOD AND PROGRAMME

CROSS REFERENCE TO RELATED APPLICATIONS

This application is a National Stage of International Application No. PCT/JP2012/053826 filed Feb. 17, 2012, claiming priority based on Japanese Patent Application No. 2011-035872 filed Feb. 22, 2011, the contents of all of which are incorporated herein by reference in their entirety.

TECHNICAL FIELD

In fault tree analysis (FTA), and in a case that minimal cut sets are required to have at most a certain maximal order, for example, M, a weeding method is introduced to remove an overlong conjunction (combination) of events generated during evaluation of the MCSs.

BACKGROUND ART

In fault tree analysis (FTA), and in a case that minimal cut sets are required to have at most a certain maximal order, for example, M, a weeding algorithm is introduced to remove an overlong conjunctions (or combinations) of events generated during evaluation of the MCSs.

A classical weeding algorithm is disclosed in NPL 1. Given a conjunction, and representing the number of order of the conjunction as V, it can be calculated by: $V = \alpha + \beta + \delta$. in which $\alpha$ and $\beta$ denote the numbers of the basic events of the conjunction and the disjunctions (OR gates) with only basic events none of which is included in category 1 and no commonality among themselves, respectively. The parameter $\delta$ is set to 1 if the conjunction contains a set of disjunctions with only basic events none of which is included in category 1 but contain a commonality among themselves; otherwise, $\delta$ is set 0.

In this algorithm, basic events and two types of OR gates are taken into account, and individual numbers of orders of other gates, such as k/n gates, are excluded (that is, the numbers of orders are simply regarded as zero when calculating V).

Moreover, a standard expanding algorithm of k/n gate is disclosed in NPL 2. According to NPL 2, and representing $e_1, \ldots, e_n$ as events, a k/n gate as given by:

$$k/n(e_1, \ldots, e_n)$$

can be expanded in the form given by:

$$k/n(e_1, \ldots, e_n) = e_1 \cdot (k-1)/(n-1)(e_2, \ldots, e_n) + (k)/(n-1)(e_2, \ldots, e_n)$$

The time complexity of this expanding algorithm can be reduced by:

$$O(k \cdot n)$$

as compared with a conventional calculating method.

CITATION LIST

Non Patent Literature

NPL 1: D. M. Rasmuson and N. H. Marshall, "FATRAM—A Core Efficient Cut-Set Algorithm", IEEE Trans. on Reliability, Vol. R-27, 1978, pp. 250-253.

NPL 2: A. Rauzy, "Toward an Efficient Implementation of the MOCUS Algorithm", IEEE Trans. on Reliability, Vol. 52, 2003, pp. 175-180.

SUMMARY OF INVENTION

Technical Problem

However, the expanding still results in a factorial space complexity in terms of the number of final resulting conjunctions, even given a maximal order M and the weeding algorithm of the non-patent reference 1. The space problem can easily result in memory out in practice, even for not so big k, n, and M. The traditional algorithms are apt to fail when relatively large and complex k/n gates are introduced, such as the server clusters of data centers in cloud computing. As used herein, "complex" refers to a condition that inputs to a k/n gate are not basic but intermediate events.

The reason is that the orders of k/n gates are not evaluated by traditional methods (i.e., simply treated as 0), and the k/n gates are supposed to be expanded repeatedly until k=1 or k=n, or the orders of the conjunctions including them are bigger than the maximal order of MCSs. This may result in a huge number of overlong conjunctions and cause memory out problem due to the factorial space complexity of expanding.

The present invention has been thus made in view of such a problem, and its object is to provide a fault tree analysis system, a fault tree analysis method, and a program therefor capable of evaluating the orders of some k/n gates without expanding, such that the overlong conjunction including these k/n gates can be weeded out earlier during the evaluation of MCSs of fault trees.

Solution to Problem

The present invention is a fault tree analysis system, comprising: k/n conjunction weeding means for weeding a conjunction including disjoint basic k/n gates and disjoint simple k/n gates and removing the conjunction if its order is greater than a given maximal order of MCSs.

The present invention is a fault tree analysis method, comprising: weeding a conjunction including disjoint basic k/n gates and disjoint simple k/n gates and removing the conjunction if its order is greater than a given maximal order of MCSs.

The present invention is a program for fault tree analysis, causing an information processing apparatus to execute: k/n conjunction weeding processing of weeding a conjunction including disjoint basic k/n gates and disjoint simple k/n gates and removing the conjunction if its order is greater than a given maximal order of MCSs.

Advantageous Effects of Invention

The present invention can weed out some overlong conjunctions including k/n gates at the early stage during evaluation of minimal cut sets (MCSs) in a fault tree.

BRIEF DESCRIPTION OF DRAWINGS

FIG. 5 is a diagram showing an exemplary rule for simplifying k/n gates.
FIG. 6 is a diagram showing a logical formula of a fault tree in a first case in Example 1.

FIG. 7 is a diagram showing a logical formula of a fault tree in a second case in Example 1.

FIG. 8 is a diagram showing a logical formula of an MCS in a fault tree in the second case after applying the present invention.

DESCRIPTION OF EMBODIMENTS

Embodiments of the present invention will now be described in detail with reference to the accompanying drawings.

Figure 1:
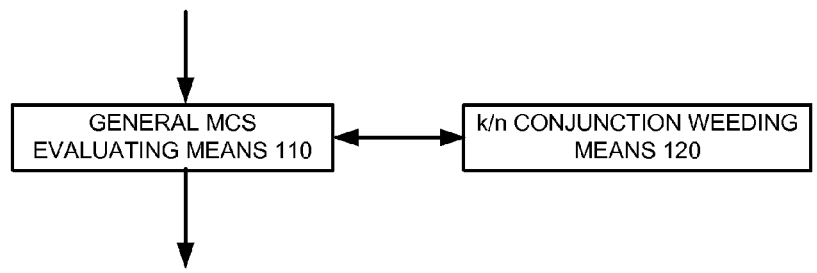
FIG. 1 is a block diagram of a first embodiment.

FIG. 1 is a block diagram of a first embodiment.

Referring to FIG. 1, the first embodiment of the present invention comprises general MCS evaluating means 110 and k/n gate conjunction weeding means 120.

These means operate as generally described below:

The general MCS evaluating means 110 reduces the MCSs from a logically expressed fault tree, and weeds non-k/n conjunctions (that do not include k/n gates) generated during the reduction of the MCSs.

The k/n conjunction weeding means 120 weeds a conjunction including disjoint basic k/n gates and/or disjoint simple k/n gates. A result of the weeding (either the original conjunction or logic False according to whether its order is less than or equal to the maximal order or not, respectively) is sent back to the general MCS evaluating means 110 for further evaluation of MCSs.

As used herein, a basic k/n gate refers to a k/n gate with inputs of only basic events.

Moreover, a simple k/n gate refers to a k/n gate with inputs of DNFs of basic events, and I call the conjunctive clauses of the DNFs as the input clauses of the k/n gate for short afterwards.

Furthermore, a disjoint k/n gate refers to a k/n gate that includes no common (repeated) input event or clause with the other events of the same conjunction.

Figure 2:
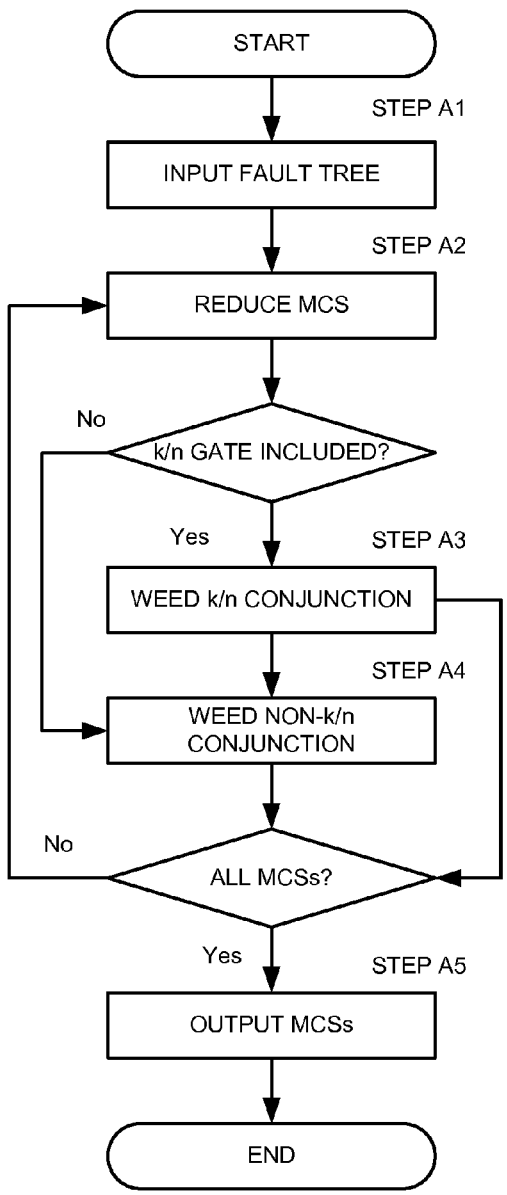
FIG. 2 is a flow chart of the first embodiment.

Next, a general operation of the present embodiment will be described in detail with reference to FIG. 1 and the flow chart in FIG. 2.

First, a fault tree in a logical expression is input to the present system (Step A1).

Subsequently, the general MCS evaluating means 110 evaluates the MCSs with traditional methods such as first transforming the input fault tree into a DNF and then removing redundant conjunctions from the DNF (Step A2).

A check is made for each (intermediate) conjunction whether the conjunction includes a k/n gate or not.

In a case that it includes a k/n gate, the conjunction is called a k/n conjunction; otherwise, a non-k/n conjunction. For a k/n conjunction, the k/n conjunction weeding means 120 applies a weeding process (Step A3). For a non-k/n conjunction, the general MCS evaluating means 110 applies a conventional weeding process (e.g., the one according to NPL 1) to it (Step A4).

The k/n conjunction weeding process proceeds by classifying events in the conjunction. Four kinds of events are considered as the order contributors of the conjunction as follows:

(1) A set of basic events, let the number (of such basic events) be $\alpha$;

(2) A set of OR gates with inputs of only basic events, none of which is included in (1) and contain no commonality (not repeated input) among themselves, let the number (of such OR gates) be $\beta$;

(3) A set of OR gates with inputs of only basic events, none of which is included in (1) but contain some commonality among themselves. A parameter $\delta$ is set to 1 in a case that the cardinality of such a set of OR gates is greater than 0; otherwise, to 0;

(4) A set of disjoint basic k/n gates and disjoint simple k/n gates, let the number (of such k/n gates) be m, and a parameter $\epsilon$ is defined as:

$$\epsilon = \Sigma_{i=1}^{m} k_i$$

The other events of the conjunction, such as AND gates with inputs of non basic events, are not considered as the contributors and their orders are treated as 0.

Representing the order of a conjunction as V, it can be calculated by $V = \alpha + \beta + \delta + \epsilon$. In a case that V>M, the conjunction is weeded out; otherwise, it is retained for further MCS reduction.

After the weeding, the system makes a check whether all conjunctions are MCSs or not. In a case that all the conjunctions are MCSs, the resulting MCSs are output (Step A5). In a case that not all conjunctions are MCSs, the process goes back to Step A2, and further MCS reduction is made.

Next, an effect of the present embodiment will be described.

The present embodiment comprises the step of evaluating the order of a disjoint basic k/n gates or a disjoint simple k/n gate, such that the order of a conjunction including disjoint basic k/n gates and/or disjoint simple k/n gates can be evaluated more accurately without expanding the k/n gates. Therefore, an overlong conjunction including disjoint basic k/n gates and/or disjoint simple k/n gates can be timely weeded out and the space (memory) for storing otherwise expanded k/n gates can be saved.

Next, a second embodiment of the present invention will be described in detail with reference to the accompanying drawings.

Figure 3:
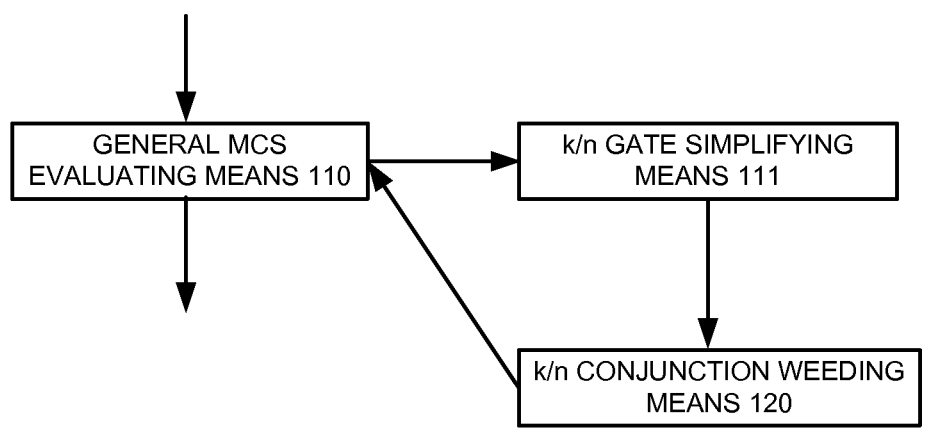
FIG. 3 is a block diagram of a second embodiment.

FIG. 3 is a block diagram of the second embodiment.

The second embodiment comprises k/n gate simplifying means 111 in addition to the first embodiment.

The k/n gate simplifying means 111 simplifies a k/n gates into a disjoint basic k/n gate or a disjoint simple k/n gate by removing the repeated input events and clauses to the k/n gate.

Figure 4:
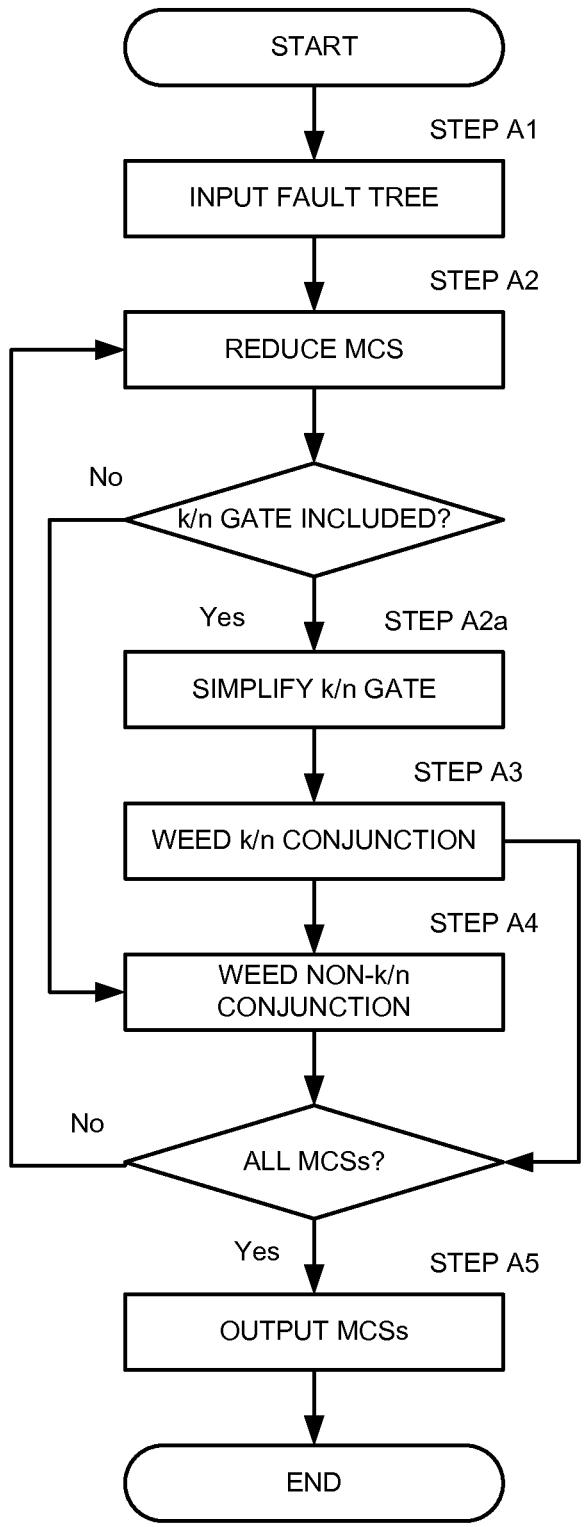
FIG. 4 is a flow chart of the second embodiment.

Next, a general operation of the second embodiment will be described in detail with reference to FIG. 3 and the flow chart in FIG. 4.

The second embodiment is similar to the first embodiment, except an additional Step A2a is added between Steps A2 and A3.

At Step A2a, the k/n gate simplifying means 111 removes the repeated inputs to simplify a k/n gate into a disjoint basic k/n gate or disjoint simple k/n gate.

Representative simplifying rules are listed in FIG. 5.

Next, an effect of the second embodiment will be described.

The second embodiment comprises a step of simplifying a k/n gate into a disjoint basic k/n gate or a disjoint simple k/n gate. Hence, a non-disjoint k/n gate can be accurately weeded without expanding any part thereof.

Example 1

Next, an operation of the embodiments of the present invention will be described using specific examples.

Two cases are used to demonstrate effectiveness of the present invention. It should be noted that the maximal order for MCSs is defined as five in the two cases.

A fault tree in the first case is comprised of only one basic k/n gate.

A fault tree in the second case is comprised of many k/n gates having repeated inputs.

A logical expression of the fault tree in the first case is shown in FIG. 6, and that in the second case in FIG. 7. As used herein, $b_i$ (i=1, . . . , n) is used to denote the basic events in a fault tree.

Referring to FIG. 6, the input fault tree in the first case is a basic 6/12 gate. Since the value of k, i.e., six, is greater than the maximal order, five, the basic 6/12 gate is weeded out by the k/n conjunction weeding means 120 (Step A3 in FIG. 2), and no qualified MCS is available for the fault tree, that is, a logical output is false.

As compared with a conventional method, the computation time in the present case for the present invention is almost zero, whereas the ITEM ToolKit 7.08 (a commercial FTA tool) based on the conventional method requires approximately 700 milliseconds.

Further, the ITEM ToolKit encounters a memory overflow error when k≥8 and n≥16, while the present invention is still capable of processing within a negligible period of time.

Referring to FIG. 7, there are many repeated inputs in the k/n gates of the fault tree, such as $b_{127}$ in 2/2 ($b_{58}+b_{127}$, $b_{59}+b_{127}$), or 2/2 ($b_{58}+b_{127}$, $b_{59}+b_{127}$) in the last complex 6/12 gate. These repeated inputs, can be removed by the k/n gate simplifying means 111 before the weeding process.

Two kinds of methods can be applied in this case as shown in FIG. 5. One is to remove the repeated inputs of the k/n gate with the help of some other events of the fault tree as denoted by the rule (5-4a), the other is to remove the repeated inputs within the k/n gates themselves as denoted by the rule (5-2a). For example, by applying the rule (5-4a) and rule (5-2a), the k/n gate 2/2 ($b_{58}+b_{127}$, $b_{59}+b_{127}$) can be simplified into the basic k/n gate 2/2 ($b_{58}$, $b_{59}$) (Step A2a in FIG. 4), because of $b_{127}$+2/2 ($b_{58}+b_{127}$, $b_{59}+b_{127}$)+ . . . =$b_{127}$+2/2 ($b_{58}$, $b_{59}$, +$b_{127}$)+ . . . =$b_{127}$+2/2 ($b_{58}$, $b_{59}$,)+ . . . . Since the basic k/n gate 2/2 ($b_{58}$, $b_{59}$) is a disjoint basic k/n gate having a number of order of k (=2), which is less than the maximal order (=5), a result of the weeding is 2/2 ($b_{58}$, $b_{59}$) (Step A3 in FIG. 4).

A final result of the fault tree in the example obtained by repetitively applying the simplifying and weeding processes is shown in FIG. 8. Note that there is no MCS including the disjoint events of the last 6/12 gate, such as $b_6$ and $b_{76}$, since the simplified k/n gate of the original 6/12 gate consisting of only these disjoint inputs is weeded out in the result by the k/n conjunction weeding means 120. The reason thereof is that the simplified k/n gate is a disjoint simple k/n gate having a number of order of k (=6), which is greater than the maximal order (=5).

Regarding the present case, the present invention requires approximately 48 milliseconds in evaluating MCSs, whereas the ITEM ToolKit requires approximately 21 seconds (not milliseconds, unlike the present invention). This comparison proves efficiency of the present invention.

Moreover, while several components may be configured in hardware, they also may be implemented by a computer program, as is obvious from the preceding description. In this case, a processor that is operated by programs stored in a program memory implements functions and/or operations similar to those in the aforementioned embodiments. It is also possible to implement part of functions of the aforementioned embodiments by a computer program.

Further, the content of the above-mentioned exemplary embodiments can be expressed as follows.

(Supplementary note 1) A fault tree analysis system, comprising:
k/n conjunction weeding means for weeding a conjunction including disjoint basic k/n gates and simple k/n gates and removing the conjunction if its order is greater than a given maximal order of MCSs.

(Supplementary note 2) The fault tree analysis system according to Supplementary note 1, comprising:
k/n gate simplifying means for removing the repeated input events and clauses to a k/n gate and simplifying the k/n gate into a disjoint basic or a disjoint simple k/n gate based on a set of simplifying rules.

(Supplementary note 3) The fault tree analysis system according to Supplementary notes 1 or 2, wherein:
said basic k/n gate refers to a k/n gate whose inputs are basic events only;
said simple k/n gate refers to a k/n gate whose inputs are DNFs (disjunctive normal forms) of basic events; and
said disjoint k/n gate refers to a k/n gate that includes no input event or clause common to another event in the same conjunction.

(Supplementary note 4) A fault tree analysis method, comprising:
weeding a conjunction including disjoint basic k/n gates and disjoint simple k/n gates and removing the conjunction if its order is greater than a given maximal order of MCSs.

(Supplementary note 5) The fault tree analysis method according to Supplementary note 4, further comprising:
removing the repeated input events and clauses to a k/n gate and
simplifying the k/n gate into a disjoint basic k/n gate or a disjoint simple k/n gate based on a set of simplifying rules.

(Supplementary note 6) The fault tree analysis method according to Supplementary notes 4 or 5, wherein:
said basic k/n gate refers to a k/n gate whose inputs are basic events only;
said simple k/n gate refers to a k/n gate whose inputs are DNFs (disjunctive normal forms) of basic events; and
said disjoint k/n gate refers to a k/n gate that includes no input event or clause common to another event in the same conjunction.

(Supplementary note 7) A program for fault tree analysis, causing an information processing apparatus to execute:
k/n conjunction weeding processing of weeding a conjunction including disjoint basic k/n gates and disjoint simple k/n gates and removing the conjunction if its order is greater than a given maximal order of MCSs.

(Supplementary note 8) The program according to Supplementary note 7, causing the information processing apparatus to execute:
k/n gate simplifying processing of removing the repeated input events and clauses to a k/n gates and simplifying the k/n gate into a disjoint basic k/n gate or a disjoint simple k/n gate based on a set of simplifying rules.

(Supplementary note 9) The program according to Supplementary notes 7 or 8, wherein:
said basic k/n gate refers to a k/n gate whose inputs are basic events only;
said simple k/n gate refers to a k/n gate whose inputs are DNFs (disjunctive normal forms) of basic events; and
said disjoint k/n gate refers to a k/n gate that includes no input event or clause common to another event in the same conjunction.

Above, although the present invention has been particularly described with reference to the preferred embodiments and examples, it should be readily apparent to those of ordinary skill in the art that the present invention is not always limited to the above-mentioned embodiments and examples, and changes and modifications in the form and details may be made without departing from the spirit and scope of the invention.

This application is based upon and claims the benefit of priority from Japanese patent application No. 2011-035872, filed on Feb. 22, 2011, the disclosure of which is incorporated herein in its entirety by reference.

REFERENCE SIGNS LIST

110 General MCS evaluating means
111 k/n gate simplifying means
120 k/n conjunction weeding means

The invention claimed is:

1. A fault tree analysis system, comprising:
computer hardware configured to implement:
a k/n conjunction weeding unit configured to classify events in conjunction, including at least one of disjoint basic k/n gates and disjoint simple k/n gates, weed the conjunction, and remove the conjunction if its order is greater than a given maximal order of minimal cut sets (MCSs).

2. The fault tree analysis system according to claim 1, comprising:
a k/n gate simplifying unit that removes repeated input events and clauses to a k/n gate and simplifies the k/n gate into a disjoint basic k/n gate or a disjoint simple k/n gate based on a set of simplifying rules.

3. The fault tree analysis system according to claim 2, wherein:
said basic k/n gate corresponds to a k/n gate whose inputs are basic events only;
said simple k/n gate corresponds to a k/n gate whose inputs are DNFs (disjunctive normal forms) of basic events; and
said disjoint k/n gate corresponds to a k/n gate that includes no input event or clause common to another event in a same conjunction.

4. The fault tree analysis system according to claim 1, wherein:
said basic k/n gate corresponds to a k/n gate whose inputs are basic events only;
said simple k/n gate corresponds to a k/n gate whose inputs are DNFs (disjunctive normal forms) of basic events; and
said disjoint k/n gate corresponds to a k/n gate that includes no input event or clause common to another event in a same conjunction.

5. A fault tree analysis method of a fault tree analysis system, comprising:
classifying events in conjunction including at least one of disjoint basic k/n gates and disjoint simple k/n gates, weeding the conjunction, and removing the conjunction if its order is greater than a given maximal order of minimal cut sets (MCSs).

6. The fault tree analysis method according to claim 5, further comprising:
removing repeated input events and clauses to a k/n gate and
simplifying the k/n gate into a disjoint basic k/n gate or a disjoint simple k/n gate based on a set of simplifying rules.

7. The fault tree analysis method according to claim 6, wherein:
said basic k/n gate corresponds to a k/n gate whose inputs are basic events only;
said simple k/n gate corresponds to a k/n gate whose inputs are DNFs (disjunctive normal forms) of basic events; and
said disjoint k/n gate corresponds to a k/n gate that includes no input event or clause common to another event in a same conjunction.

8. The fault tree analysis method according to claim 5, wherein:
said basic k/n gate corresponds to a k/n gate whose inputs are basic events only;
said simple k/n gate corresponds to a k/n gate whose inputs are DNFs (disjunctive normal forms) of basic events; and
said disjoint k/n gate corresponds to a k/n gate that includes no input event or clause common to another event in a same conjunction.

9. A non-transitory computer readable storage medium storing a program for fault tree analysis, causing an information processing apparatus to execute:
classifying processing of classifying events in conjunction including at least one of disjoint basic k/n gates and disjoint simple k/n gates,
k/n conjunction weeding processing of weeding the conjunction, and removing the conjunction if its order is greater than a given maximal order of minimal cut sets (MCSs).

10. The non-transitory computer readable storage medium storing a program according to claim 9, causing the information processing apparatus to execute:
k/n gate simplifying processing of removing repeated input events and clauses to a k/n gate and simplifying the k/n gate into a disjoint basic k/n gate or a disjoint simple k/n gate based on a set of simplifying rules.

11. The non-transitory computer readable storage medium storing a program according to claim 9, wherein:
said basic k/n gate corresponds to a k/n gate whose inputs are basic events only;
said simple k/n gate corresponds to a k/n gate whose inputs are DNFs (disjunctive normal forms) of basic events; and
said disjoint k/n gate corresponds to a k/n gate that includes no input event or clause common to another event in a same conjunction.

12. The non-transitory computer readable storage medium storing a program according to claim 10, wherein:
said basic k/n gate corresponds to a k/n gate whose inputs are basic events only;
said simple k/n gate corresponds to a k/n gate whose inputs are DNFs (disjunctive normal forms) of basic events; and
said disjoint k/n gate corresponds to a k/n gate that includes no input event or clause common to another event in a same conjunction.

* * * * *